Jan. 17, 1939.  D. L. GALLUP  2,144,016
BRAKE
Filed July 28, 1932  2 Sheets-Sheet 1

INVENTOR.
DAVID L. GALLUP
BY Jerome R. Cox
ATTORNEY.

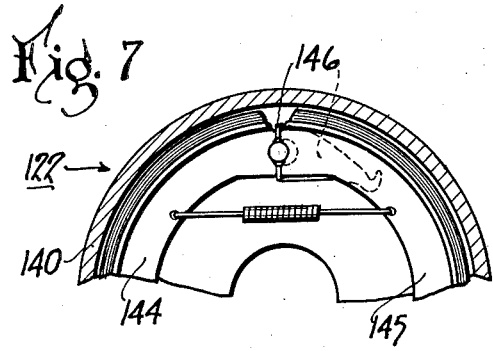
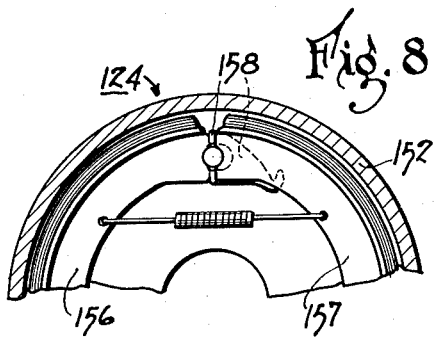
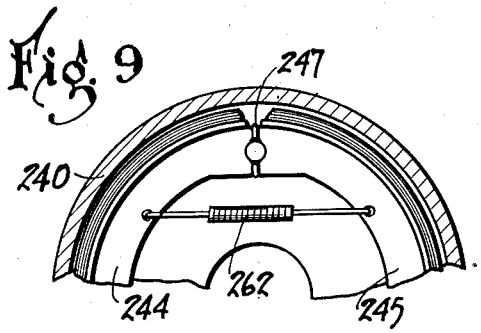
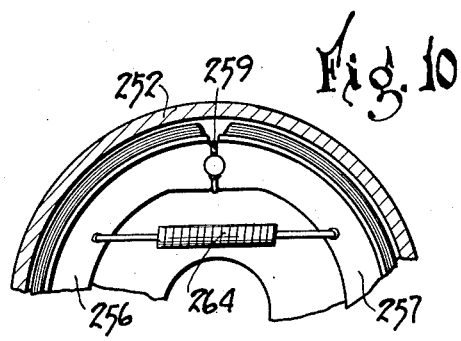
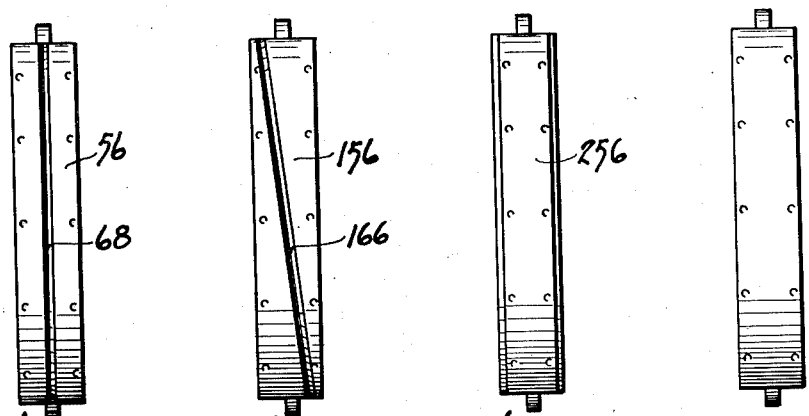

Patented Jan. 17, 1939

2,144,016

UNITED STATES PATENT OFFICE 2,144,016

BRAKE

David L. Gallup, South Bend, Ind., assignor to Bendix Aviation Corporation, South Bend, Ind., a corporation of Delaware Application July 28, 1932, Serial No. 625,463

21 Claims. (Cl. 188—217)

This application relates to automotive vehicles and especially to the steering and braking thereof.

Where brakes are applied to the steering wheels of an automobile, an undesirable tendency to turn from one side to another is often encountered when brakes are applied.

This tendency is due to the forward movement of the chassis frame relative to the axle, and which movement finds its origin in the details of front axle and spring suspension, included in which are such items as the following:

1. Existence of shimmy preventatives, such as a kick shackle.
2. Details of spring design.
3. Tendency of axle to bend or twist.
4. Location of steering arm ball.
5. Distance between the point of intersection of the king pin axis with the ground and the point of contact of the tire on the ground.
6. Other details which need not be specifically catalogued.

This tendency to turn is caused by what is frequently referred to as "axle roll", but which "axle roll" must be considered as including part or all of the items indicated above. This "axle roll" is caused by the tendency of the body of the automobile to continue its forward motion. The retardation of the wheels through the brakes causes a rolling or twisting of the springs by which the axle supports the body and causes the portion of the axle above a horizontal axis to tip forward, and the portion below this axis to move rearward relative to the chassis.

Inasmuch as the steering arm is attached to one of the front wheels, usually the left front wheel, and inasmuch as the other end thereof is held substantially stationary by the drag link and steering linkage, the relative rearward movement of the axle causes the wheels to turn to one side or the other when the brakes are applied. If the connection between the drag link and steering arm is below the axis of the axle (as is usually the case) the turning is aggravated by "axle roll". This tendency is greatest when the vehicle is being rapidly decelerated while being driven at great speed. The unexpected turning of the wheels at this time will cause an actual turning of the vehicle and possibly a disaster.

The difficulties above referred to seem most disadvantageous in braking systems where the brake applying forces transmitted to the respective brakes are equalized. Where the forces are not equalized usually adjusting one of the brakes out of "position" eliminates the difficulty, but not under all conditions, and neither is it permanent.

One of the objects of this invention is to provide means for overcoming the swerving to one side of automotive vehicles normally caused by front axle movement when the brakes are applied.

A further object of the invention is to provide means which overcome the turning, not only under normal braking conditions, but also even under extraordinary conditions such as may be encountered after making repeated stops from high speeds.

One of the features of the invention is the provision of means for applying a lesser force to the front brake on one side of the vehicle than to the front brake on the other side thereof, such means taking the form of a smaller fluid pressure cylinder (when hydraulic actuation is used), or a shorter lever arm (when mechanical actuation is used), or a heavier spring which holds the brake shoes together.

Another feature of the invention is the provision for the brake which has the least brake applying force exerted thereon, of the linings on the shoes in that brake having a smaller area of contact than exists in connection with the corresponding linings on the brake shoes in the brake on the opposite side of the vehicle. I have found that the lining on the shoes in one brake should be substantially proportionately smaller in area so that the unit pressure would be the same.

Further objects and features of the invention will be apparent after a reading of the subjoined specification and claims and after a consideration of the accompanying drawings in which:

Figure 7 is a fragmentary view in vertical section showing a right front wheel adapted to be used on a modified form of my invention;

Figure 8 is a view similar to Figure 7 showing the left front wheel;

Figure 9 is a view similar to Figure 7 showing another modified form of right front wheel;

Figure 10 is a view similar to Figure 9 showing a modified form of left front wheel corresponding to the form shown in Fig. 9.

Figure 11 is a view in elevation of a brake shoe adapted to be used on one of the left front wheels;

Figure 12 is a view of another brake shoe also adapted to be used on any of the left front wheels;

Figure 13 is a view of another brake shoe adapted to be used on any of the left front wheels;

Figure 14 is a view of a brake shoe adapted to be used on any of the right front wheels, and Figure 15 is a view of a pair of brake shoes having spiral registering grooves and adapted to be used on any of the left front wheels.

Figure 1:
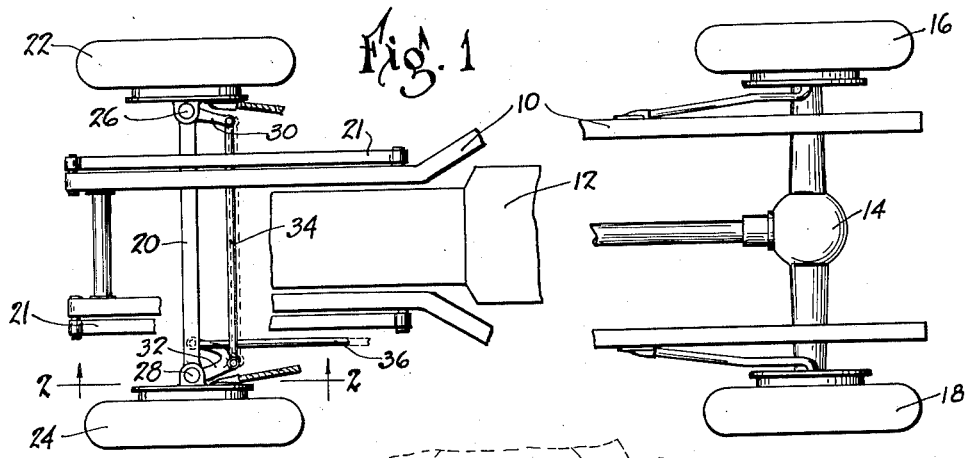
Figure 1 is a plan view of the chassis and engine of an automobile having braking and steering parts constructed according to my invention, portions being broken away to show more clearly the features of the invention.
Figure 2:
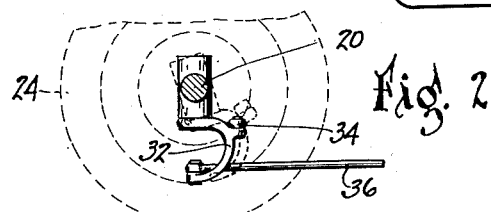
Figure 2 is a view in section taken substantially on the line 2—2 of Figure 1.
Figure 3:
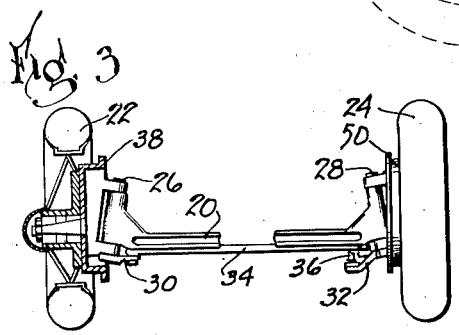
Figure 3 is a view in front elevation of the automobile shown in Figure 1, parts being broken away to show the invention more clearly.

Referring in detail to the drawings, and particularly to Figs. 1, 2, and 3, it may be seen that there is disclosed an automobile having a frame 10; an engine 12; a rear axle 14 supported by rear wheels 16 and 18; and a front axle 20 supported by front wheels 22 and 24. The wheels 22 and 24 are carried on short pivoted axles comprising wheel spindles carried by the steering knuckles 26 and 28. The knuckles are connected to the axle 20 which supports the frame 10 through springs 21. The steering knuckles 26 and 28 are provided with steering lever arms 30 and 32 and connecting these arms is a transverse steering linkage comprising a tie bar 34. Also connected to the lever arm 32 is a longitudinal steering linkage comprising a drag link 36 which is connected through any suitable linkage with the hand steering wheel for the vehicle.

Figure 4:
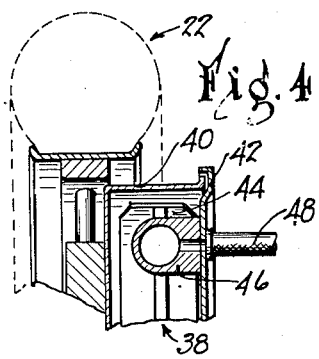
Figure 4 is a fragmentary view in vertical section and on a slightly enlarged scale showing the right front wheel of Figures 1 and 3.
Figure 5:
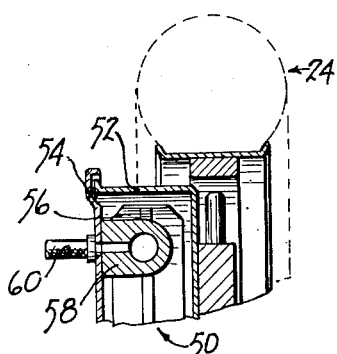
Figure 5 is a fragmentary view in vertical section and on an enlarged scale showing the left front wheel of the automobile of Figures 1, 2, and 3.

Brakes as shown in Figs. 4 and 5 are provided for each of the wheels 22 and 24, the wheel 22 having the brake 38 which includes a drum 40. Associated with the drum 40 is a backing plate 42 which carries brake shoes such as 44 and an actuating cylinder 46 to which fluid under pressure is supplied through a hose 48.

The wheel 24 is provided with a brake 50 which includes a drum 52, and a backing plate 54 to which are secured shoes such as the shoe 56 and to which is also secured a cylinder 58 of a smaller area than cylinder 46 secured to the right wheel 22 adapted to receive fluid pressure through a hose 60 and to apply the shoes to the drum.

Figure 6:
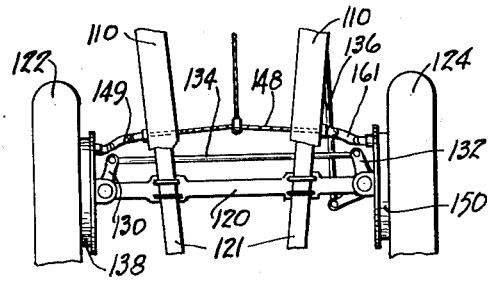
Figure 6 is a fragmentary view in plan showing a modified form of my invention.

In Figures 6, 7, and 8 there is shown a mechanical hookup in which wheels 122 and 124 are mounted on an axle 120 which supports the frame 110 through springs 121. The wheels are steered by means of steering arms 130 and 132, a tie-rod 134, and a drag link 136. The wheels are provided with brakes 138 and 150 which are adapted to be actuated by means of cable 148, operating in conduits 149 and 161 and acting on cam levers 146 and 158. The cable is operated through any suitable means so that equal pressure is exerted on both cables. The cam levers 146 and 158 are equipped with cams which are adapted to force the shoes 144 and 145 into contact with the drum 140 and the shoes 156 and 157 into contact with the drum 152.

In Figures 9 and 10 there is shown a different method of offsetting the tendency of the automobile to turn under the influence of brake application. Therein the drum 240 is provided with shoes 244 and 245 which are adapted to be actuated by a cam 247. Interposed between the shoes is a return spring 262 of relatively small strength. The drum 252 is provided with shoes 256 and 257 adapted to be actuated by a cam 259 and connected by a return spring 264 of relatively great strength.

The shoes 56, 156, and 157; and 256 and 257 are formed with a smaller contacting surface than that of the shoes 44, 144, 145, 244, and 245. The linings on the shoes 56 and 57 are formed with grooves 68 extending throughout their length and registering with each other. The lining areas of the shoes 56, 156, and 157 are reduced over the corresponding areas of the shoes 44 and 144 and 145 by means of grooves. As shown, the lining of shoe 156 is provided with a groove 166 which may be formed as a portion of a spiral. The shoes 256 and 257 have narrower lining than the corresponding shoes 244 and 245. The arrangement shown in Figure 12 is designed to prevent formation of a ridge upon the cooperating brake drum. Figure 15 shows another arrangement similar to that of Figure 12 but in which the grooves 366 in the linings of the shoes 356 and 357 are in spiral registration.

It is thought that the operation of the above described embodiments of my invention will be clear from the above description. When the brakes are applied the springs will be deflected, the axle will tend to rotate to the dotted position shown in Figure 2. If the drag link 36 were also turned to the dotted line position there would be no relative movement of the steering mechanism. However, normally the link 36 will be maintained in the position shown in full lines and the wheel 24 will tend to turn outward and the wheel 22 will tend to turn inward. However, due to the fact that the cylinder 58 has a much smaller area than the cylinder 42, the force applying the brake 50 will be less than that applying the brake 38 and this will create a tendency for the springs on the side having the wheel 22 to deflect more than the springs on the side having the wheels 24 and the wheel 22 will be moved rearwardly relative to the chassis further than the wheel 24. This would tend to turn the car to the right. However, since the rearward movement of the axle on the left side of the car with the drag link held in position will tend to turn the wheels to the left, the two forces will balance each other, and the objectionable turning tendency otherwise present upon the application of the brakes will be eliminated.

In the modification shown in Figures 6, 7, and 8, the equalized force applied through the cables is transmitted to the brakes through the cam levers 146 and 158. Due to the increased length of the lever 146 greater force is utilized to apply the shoes 144 and 145 to the drum 140 and this greater force creates greater braking effort thus tending to cause the wheel associated therewith to turn inward and this tendency offsets the tendency of the vehicle to turn due to the axle roll.

In the device shown in Figures 9 and 10 equal forces are applied to each of the two brakes, but in view of the stronger spring 264, more braking force is applied to the drum 240, and the objectionable turning tendency is thereby eliminated.

Due to the fact that the shoes 56, 156, and 256 have areas bearing substantially the same proportion to the area of the corresponding shoes on the other side of the vehicle, as the smaller applying force on the same side bears to the larger applying force on the opposite side, the force per unit area of brake surface is equal on both sides, and the heat produced is equal per unit of area. The heating of the drums is consequently substantially equal. The temperature, therefore, of each brake will remain substantially the same regardless of the number of stops or from what speed the brakes are applied.

Therefore continued application of the brakes and heating of the drums does not have the effect of destroying the balance between the turning forces.

It is to be understood that while I have described the brake shoes shown in Figures 11, 12, and 13 as combined with the brake structures shown in Figures 3, 4, and 5; Figures 6, and 7, and Figures 9, and 10 respectively, yet any of the shoes shown may be advantageously combined with any of the brake structures.

It is to be understood that the above described embodiments of my invention are for the purpose of illustration only and various changes may be made therein without departing from the spirit and scope of the invention.

I claim:

1. In an automotive vehicle, steerable wheels, an axle supported by said wheels, brakes for said wheels, means for steering said wheels including a connection offset from the axis of said axle, and means for applying one of said brakes at all times with lesser force than the other of said brakes.

2. In an automotive vehicle, steerable wheels, an axle supported by said wheels, brakes for said wheels, means for steering said wheels, means for applying one of said brakes with lesser force than another of said brakes, and equalized operating mechanism for said applying means.

3. In an automotive vehicle, steerable wheels, an axle supported by said wheels, brakes for said wheels, means for steering said wheels, and means for applying one of said brakes at all times with lesser force than the other of said brakes, but with a force always proportionate to the force on said other brake.

4. In an automotive vehicle, steerable wheels, an axle supported by said wheels, brakes for said wheels, means for steering said wheels, and hydraulic means for applying one of said brakes at all times with lesser force than the other of said brakes.

5. In an automotive vehicle, steerable wheels, an axle supported by said wheels, brakes for said wheels, means for steering said wheels, and means for applying one of said brakes with lesser force than another of said brakes, said brake applying means including a cylinder on one side having a smaller effective area than the cylinder on the other.

6. In an automotive vehicle, steerable wheels, an axle supported by said wheels, springs connected to said axle and supported by said wheels, brakes for said wheels, and means for applying one of said brakes at all times with lesser force than the other of said brakes.

7. In an automotive vehicle, a pair of steerable wheels, an axle supported by said wheels, brakes for said wheels each including a friction element, means for steering said wheels, and means for applying one of said brakes with lesser force than the other of said brakes, the friction element for the wheel having the smaller applying force formed with a smaller effective area than the friction element on the other wheel.

8. In an automotive vehicle, a pair of steerable wheels, an axle supported by said wheels, brakes for said wheels, means for steering said wheels including a connection offset from the axis of said axle, means for applying one of said brakes with lesser force than the other of said brakes, and brake shoes for both wheels, the shoes for the brake having the smaller applying force being formed with a substantially proportionately smaller effective area than the brake shoes on another of said brakes and being formed with a groove.

9. In an automotive vehicle, steerable wheels, an axle supported by said wheels, brakes for said wheels, springs for said brakes, and means for steering said wheels including a connection offset from the axis of said axle, the spring for one of said brakes being of lesser strength than the spring for the other brake.

10. In an automotive vehicle, a pair of steerable wheels, an axle supported by said wheels, springs connected to said axle for supporting said wheels, brakes for said wheels, means for operating said brakes, return springs for said brakes, means for steering said wheels including a connection offset from the axis of said axle, and means for equalizing the force of said applying means, the spring for one of said brakes being of lesser strength than the spring of the other brake, whereby the difference in the strength of the springs offsets the effect of axle roll.

11. In a braking system a brake, and a pair of shoes for said brake, each formed with a spiral groove extending from one end of the shoe to the other and registering with the groove in the other shoe.

12. In an automotive vehicle, a pair of brakes on opposite sides of the vehicle, a pair of fluid pressure cylinders arranged in said brakes respectively, and pistons for said cylinders, one of which has a greater effective area than the other.

13. An automotive vehicle, comprising a resiliently supported front axle, dirigible wheels at either end thereof rotatable on short pivoted axles, transverse steering linkage connecting said pivoted axles, steering means comprising longitudinal steering linkage connected to one of said pivoted axles and including a lever arm eccentric to the axis of axle brake reaction rotation, said wheels adapted to contact a road surface at points laterally displaced from the steering axes of the pivoted axles, and a brake for each of said wheels, said brakes being dissimilar for unequal braking action.

14. An automotive vehicle comprising a resiliently supported front axle, dirigible wheels at either end thereof rotatable on short pivoted axles, transverse steering linkage connecting said pivoted axles, steering means comprising longitudinal steering linkage connected to one of said pivoted axles and including a lever arm connected to said pivoted axle and acted upon at a point vertically eccentric to the axis of axle twist due to brake reaction, said wheels adapted to contact a road surface at points laterally displaced from the steering axes of the pivoted axles, a brake for each of said wheels, means to operate said brakes simultaneously, and means rendering one of said brakes at all times less effective than the other.

15. Steering mechanism in an automotive vehicle comprising steering wheels adapted to contact a road surface at points laterally spaced from their steering axes, brakes on each of said wheels, means to apply the brakes together, steering actuating mechanism effective to urge a turning movement of the steering wheels to deviate from the course set at the instant of brake application, and means rendering one of said brakes less effective than the other to compensate for effect of the steering mechanism urging toward turning movement.

16. An automotive vehicle comprising steering front wheels, steering mechanism therefor, brakes thereon, said wheels having a tendency to deviate from their course upon brake application due to turning movement of brake reaction, means for operating said brakes simultaneously, and means for rendering one brake less effective than the other to compensate for said deviation tendency.

17. In a vehicle, a pair of dirigible front wheels, brakes thereon, steering mechanism adapted to be effected by brake application, means for applying said brakes together, and means rendering one of said brakes less effective than the other to neutralize the brake application effect on the steering mechanism.

18. In a vehicle, a pair of dirigible wheels, an axle, brakes thereon, steering control mechanism effected by the brake reaction turning movement of said axle, and means on said brakes for effecting unequal brake application to counteract the effect of said brake reaction on said steering control mechanism.

19. The combination with a vehicle having a front axle, front steering wheels mounted on the axle and each having a brake mechanism associated therewith, means tending to induce turning of the wheels upon retardation of the vehicle, and means for relieving the braking force upon one of said front brake mechanisms of one of the steering wheels to prevent the vehicle from steering to one side upon brake application.

20. The combination with a vehicle having a front axle induced to move upon retardation of the vehicle, a spring supported thereon, front steering wheels mounted on the axle and each having a brake mechanism associated therewith, steering mechanism associated with the axle and including means tending to induce steering of the vehicle to one side upon application of the brake; of means for relieving the braking force upon one of said front brake mechanisms of one of the steering wheels to counteract the tendencies of the vehicle to steer to one side upon brake application.

21. The combination with a vehicle having a front axle induced to move upon retardation of the vehicle, a spring supported thereon, front steering wheels mounted on the axle and each having a brake mechanism associated therewith, steering mechanism associated with the axle and including means tending to induce steering of the vehicle to one side upon application of the brakes, an operating member, a non-elastic connection between the operating member and one of said brake mechanisms; of means for relieving the braking force upon one of said brake mechanisms of one of the steering wheels to counteract tendencies of the vehicle to steer to one side upon brake application.

DAVID L. GALLUP.